United States Patent [19]

Tsujimoto et al.

[11] Patent Number: 4,834,503
[45] Date of Patent: May 30, 1989

[54] LIQUID CRYSTAL DRIVING SYSTEM

[75] Inventors: Shinichi Tsujimoto, Tokyo; Jiro Kazumi, Kanagawa, both of Japan

[73] Assignee: Canon Kabushiki Kaisha, Tokyo, Japan

[21] Appl. No.: 169,072

[22] Filed: Mar. 16, 1988

Related U.S. Application Data

[63] Continuation of Ser. No. 677,914, Dec. 4, 1984, abandoned.

[30] Foreign Application Priority Data

Dec. 6, 1983 [JP] Japan ................. 58-230267

[51] Int. Cl.⁴ .............................................. G02F 1/133
[52] U.S. Cl. ..................................... 350/332; 340/784; 350/335
[58] Field of Search ................ 340/717, 764, 784; 350/332, 334, 335, 342

[56] References Cited

U.S. PATENT DOCUMENTS

| | | | |
|---|---|---|---|
| 3,761,171 | 9/1973 | Fields | 350/342 |
| 4,336,536 | 6/1982 | Kalt et al. | 340/764 |
| 4,392,719 | 7/1983 | Sekimoto | 350/332 |
| 4,423,929 | 1/1984 | Gomi | 350/332 |
| 4,436,376 | 3/1984 | Fergason | 350/332 |
| 4,547,043 | 10/1985 | Penz | 350/335 |
| 4,555,701 | 11/1985 | Dahl et al. | 340/736 |

Primary Examiner—John K. Corbin
Assistant Examiner—Martin Lerner
Attorney, Agent, or Firm—Toren, McGeady & Associates

[57] ABSTRACT

In a liquid crystal driving system for driving a plurality of liquid crystal display devices with a single liquid crystal driver, segment signals from the driver are connected in common to the liquid crystal devices. Meanwhile, common signals which are connected to the liquid crystal display devices are in different waveforms from each other.

7 Claims, 8 Drawing Sheets

FIG. 8(a) COM 
FIG. 8(b) SEG1 
FIG. 8(c) SEG2 
FIG. 8(d) COM' 
FIG. 8(e) COM-SEG1 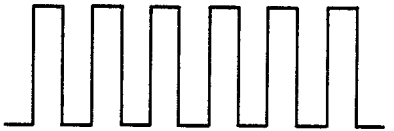
FIG. 8(f) COM-SEG2 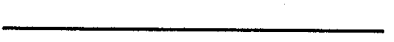
FIG. 8(g) COM'-SEG1 
FIG. 8(h) COM'-SEG2 

FIG.10(a) COM1 
FIG.10(b) COM2 
FIG.10(c) SEG1 
FIG.10(d) SEG2 
FIG.10(e) COM1″ 
FIG.10(f) COM2″ 
FIG.10(g) COM1-SEG1 
FIG.10(h) COM1-SEG2 
FIG.10(i) COM1′-SEG1 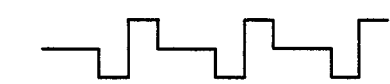
FIG.10(j) COM1′-SEG2 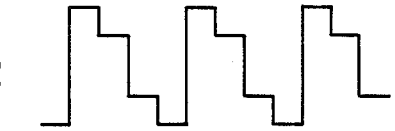

LIQUID CRYSTAL DRIVING SYSTEM

This is a continuation of application Ser. No. 677,914, filed Dec. 4, 1984, now abandoned.

BACKGROUND OF THE INVENTION

1. Field of the Invention:

This invention relates to a method for driving liquid crystal display devices and more particularly to a driving method for causing at least two liquid crystal display devices to simultaneously give the same display.

2. Description of the Prior Art:

Among the data imprinting devices for cameras, devices of the kind using liquid crystal display devices have increased in number during recent years. This tendency has resulted from the fact that the use of liquid crystal displays permits reduction in the thickness of the data imprinting device and also reduces cost. The basic arrangement of such a data imprinting device for a camera is as shown in FIG. 1 of the accompanying drawings. Referring to FIG. 1, the illustration includes a camera 1; a data imprinting device 2 which is provided on the back lid of the camera 1; a film 3; and a printed circuit board 4 on which an LSI 5 including a liquid crystal driver is mounted. On the printed circuit board 4 are further provided a transmission type liquid crystal display element (hereinafter referred to as LCD) 6 for data imprinting and a reflection type liquid crystal display element 7 for outside monitoring. The display elements 6 and 7 are respectively mounted on the board 4 through liquid crystal retainers 8 and 10 and elastic condcutors 9 and 11. The illustration further includes a lamp 12 which is a data imprinting light source, such as an LED or the like, and which illuminates the imprinting LCD 6 via apertures 13 and 14, a lens 15 and a light transmitting hole 4A provided in the printed circuit board 4. With the LCD 6 illuminated in this manner, the data displayed on the LCD 6 is imprinted on the film 3 in a shadowgraph like manner. The external monitor LCD 7 shows the same data as that of the LCD 6 to the outside by means of a reflection light through a display window provided in the back lid.

FIG. 2 shows the circuit arrangement of this device. A liquid crystal driver 5A is included in the above LSI 5 and is of the static driving type. Segment signal terminals "b" drive segments of the monitor LCD 7. Some of or all of the segment signal terminals "b" are also connected in parallel to the imprinting LCD 6. Data which is identical with a part of or the whole of the data displayed by the LCD 7 is also concurrently displayed by the LCD 6. This method of connection is considered to be the best method for reducing the number of terminals required for the liquid crystal driver 5A and for reducing the space required for wiring patterns.

A common signal terminal "a" is connected in common to the LCD 6 and the LCD 7. With the circuit arranged in this manner, when a segment 7-1-a of the monitor LCD 7, for example, is lit, a corresponding segment 6-1-a of the imprinting LCD 6 is also lit. When another segment 7-1-g of the LCD 7 is not lit, a corresponding segment 6-1-g of the LCD 6 is also not lit. However, since the LCD 7 is of the reflection type while the LCD 6 is of the transmission type, their displays are in a positive-and-negative reversed relation. Reference numeral 16 identifies a power supply; a transistor 17 lights up the light source 12; and a control circuit 5B controls the timing for a lighting up action.

FIG. 3 is a sectional view showing the structural arrangement of the above imprinting LCD 6. The illustration includes polarizing plates 18 and 19 which have polarizing characteristics, as indicated by arrows A and B; glass plates 20 and 21; a common electrode 22; a segment electrode 23; insulting films 25 and 26; sealants 27 and 28; and a metal mask 24 which is obtained by vapor depositing nickel or the like. The metal mask 24 includes light transmitting parts (or holes) 24a while the remainder 24b of the mask 24 has a light shielding property as shown in FIG. 4. The light transmitting parts 24a are formed in shapes according to the figures to be displayed. A liquid crystal layer 29 is sealed up in between the glass plates 20 and 21. The layer 29 is in many cases prepared by adding a dichromatic dye to a TN type liquid crystal. The light which is emitted from the light source 12 becomes an approximately parallel pencil of rays passing through the above aperture and the lens 15 and is going toward the film 3 passing through the above-stated parts 18, 20, 22, 24, 25, 29, 26, 21 and 19, 107 after another. However, since the polarizing plates 18 and 19 have the same polarizing direction, the portion of the light impinging on the non-conductive segments of the liquid crystal, i.e. liquid crystal portions having 90° rotatory polarization characteristics are not allowed to pass through them and thus fail to reach the film 3. Conversely, a conductive liquid crystal portion which has received power to lose the rotary polarizing property allows a portion of the illumination light to pass therethrough and to reach the film 3. The conventional imprinting LCD 6 thus energizes the segments which are to be used for forming display figures to allow the light to pass through them for imprinting the figures or letters, etc. on the film 3. However, since the polarizing direction A,B of one polarizing plate 18 or 19 is the same as that of the other and the light shielding performance is dependent on the 90° rotary polarization of the liquid crystal molecules, the conventional LCD has not enhanced the constrast of the display, or the ratio of the transmission factor of an energized portion to that of a non-energized portion, by an insufficient absolute light shielding degree. This has resulted in poor quality letters and figures of data to be imprinted on the film 3.

To compensate for this drawback, the constrast has been increased by adding the dichromatic dye to the liquid crystal. However, this method not only causes an increase in cost but also results in a decrease response. To solve this problem, it has been contrived to use an LCD 6' which is arranged as shown in FIG. 5 for imprinting. In FIG. 5, the same component parts as those shown in FIG. 3 are identified by the same reference numerals. The arrangement of FIG. 5 differs from that of FIG. 3 in that polarizing directions C and D of polarizing plates 18' and 19' differ from each other by 90 or 270 degrees. By virtue of this difference, a portion of the illumination light impinging upon non-energized segments having 90° rotary polarizing property is allowed to reach the film by passing through the polarizing plate 19' while energized segments do not allow the light to pass through them. In other words, there is obtained a relation which is the reverse of the LCD 6 of FIG. 3. In accordance with this method, the light shielding performance can be greatly enhanced for improved constrast since it is no longer dependent on the 90° rotary polarization of the liquid crystal molecules and the light is prevented from passing through by virtue of the difference in the polarizing direction C,D between the polarizing plates 18' and 19'. Therefore, addition of the dichromatic dye is no longer necessary. This method thus prevents the cost of the display device from increasing and the response thereof from decreasing.

FIG. 6(a) shows an energized state of and a display made by the LCD 6 shown in FIG. 3. FIG. 6(b) shows the energized state of the LCD 6' shown in FIG. 5. Since they have polarizing directions A,B and C,D conversely arranged as mentioned above, the relation between energized segments and non-energized segments of the LCD 6 is reverse to that of the LCD 6' in displaying the same figures. In these drawings, blackened segments represent segments energized segments and voidly shaped segments non-energized segments. In the LCD 6 shown in FIG. 6(a), the segments to be displayed are energized to make them light transmissive. Whereas, in the case of the LCD 6' shown in FIG. 6(b), the segments to be displayed are not energized and are made light transmissive.

It is preferable for the data imprinting device 2 of the camera 1 to have good contrast both for display and imprinting without adding a dichromatic dye as with the LCD 6' described above. However, in that case, with the driving circuit 5A of FIG. 2, which is arranged to use the segment terminal b and the common terminal a in common for both the imprinting LCD 6 and the monitor LCD 7, there arises the following problem:

More specifically, when the segment driver 5a does not energize the segments of the imprinting LCD 6 which are to be used for a display and energize the segments which are not to be used for the display, the reflection type monitor LCD 7, which is of the TN type, has its non-energized segments become light transmission regardless of the polarizing directions C, D of the upper and lower polarizing plates 18', 19' and thus the color of these segments becomes barely discernible from that of the reflecting plate. As a result, the display by the LCD 7 becomes as shown in FIG. 6(b).

It is an object of this invention to provide a data imprinting device 2 in which the LCD's 6,7 make a high contrast display as described above with reference to FIG. 5 by a simple method without incurring the above-stated drawback of the prior art device.

The above and further objects and features of the invention will become apparent from the following detailed description of preferred embodiments thereof taken in conjunction with the accompanying drawings.

SUMMARY OF THE INVENTION

To attain the object, in accordance with this invention, the liquid crystal driving circuit uses the single liquid crystal driver 5A for driving both the transmission type LCD 6' which makes a display of letters or figures or the like with non-energized segments and the reflection type LCD 7 which makes the same display with energized segments. Segments signals from the liquid crystal driver 5A are connected in common to these LCD's 6, 7 while common signals connected to these LCD'6, 7 are in different waveforms from each other.

BRIEF DESCRIPTION OF THE DRAWINGS

FIG. 1 is a sectional view showing the outline of a date imprinting device for a camera.

FIG. 2 is a circuit diagram showing the circuit of the same data imprinting device.

FIG. 3 is a sectional view showing a transmission type LCD for data imprinting.

FIG. 4 is a plan view of a mask.

FIGS. 8(a)-8(h) are charts showing the waveforms of the same embodiment.

FIGS. 10(a)-10(j) are charts showing the waveforms of the circuit arrangement shown in FIG. 9.

Figure 7:
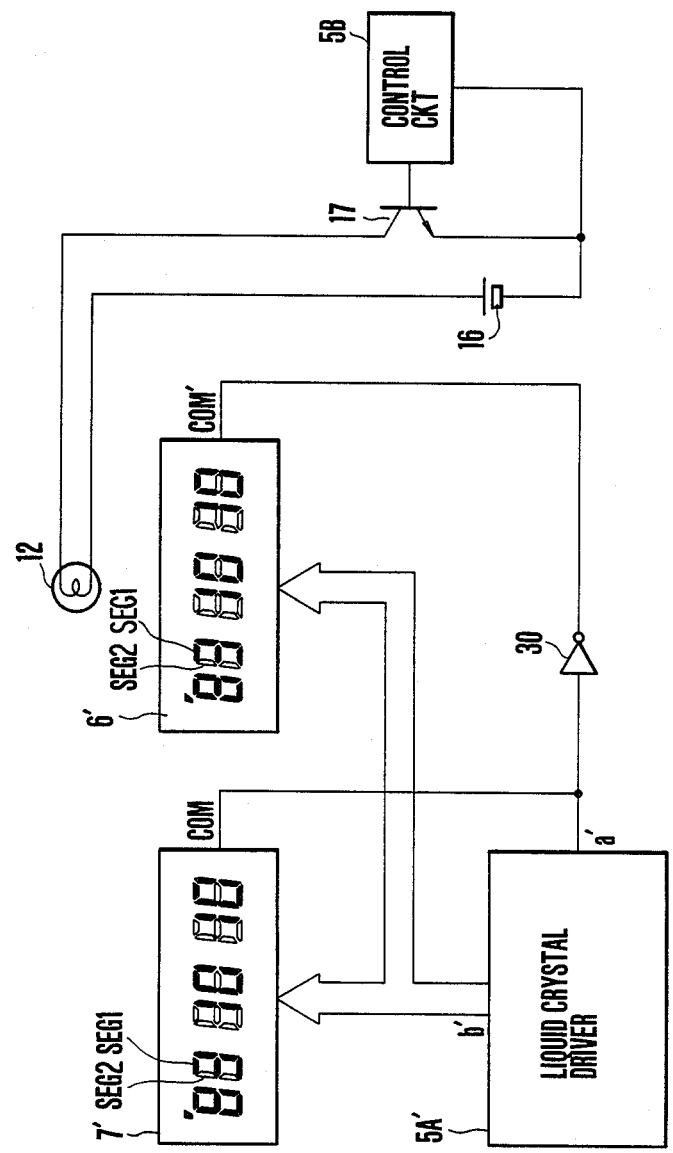
FIG. 7 is a circuit diagram showing the circuit arrangement in an embodiment of the invention.

DETAILED DESCRIPTION OF THE PREFERRED EMBODIMENTS:

FIG. 7 is a circuit diagram showing the circuit arrangement of an embodiment of this invention. The illustration includes a monitor LCD 7' and the imprinting LCD 6'. Both of these LCD's 7' and 6' block the transmission or reflection of light when a voltage is applied thereto and permit the transmissin or reflection of the light when no voltage is applied thereon. The circuit arrangement includes a liquid crystal driver 5A' which statically drives the LCD's 7' and 6'. The driver 5A' is provided with segment signal terminals "b'" which are respectively connected to corresponding segments of the LCD's 7' and 6', as applicable, and a common signal terminal "a'" which is connected to a common terminal COM of the LCD 7' and also to a common terminal COM' of the other LCD 6' through an inverter 30.

Figure 1:
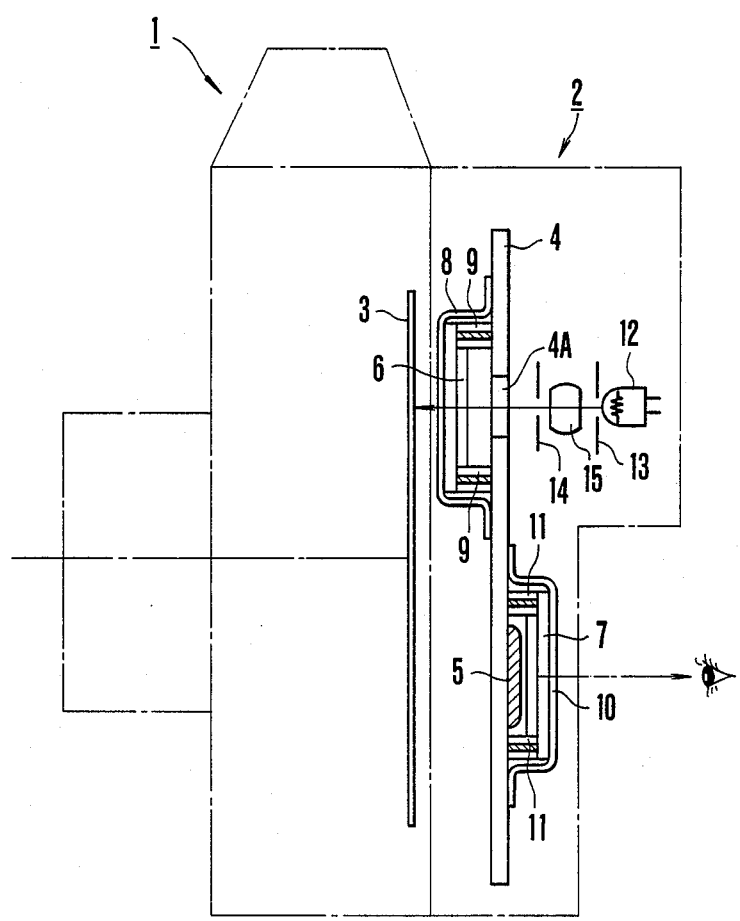
FIGS. 1 through 4 show, by way of example, the device of the prior art. Of these drawings.
Figure 2:
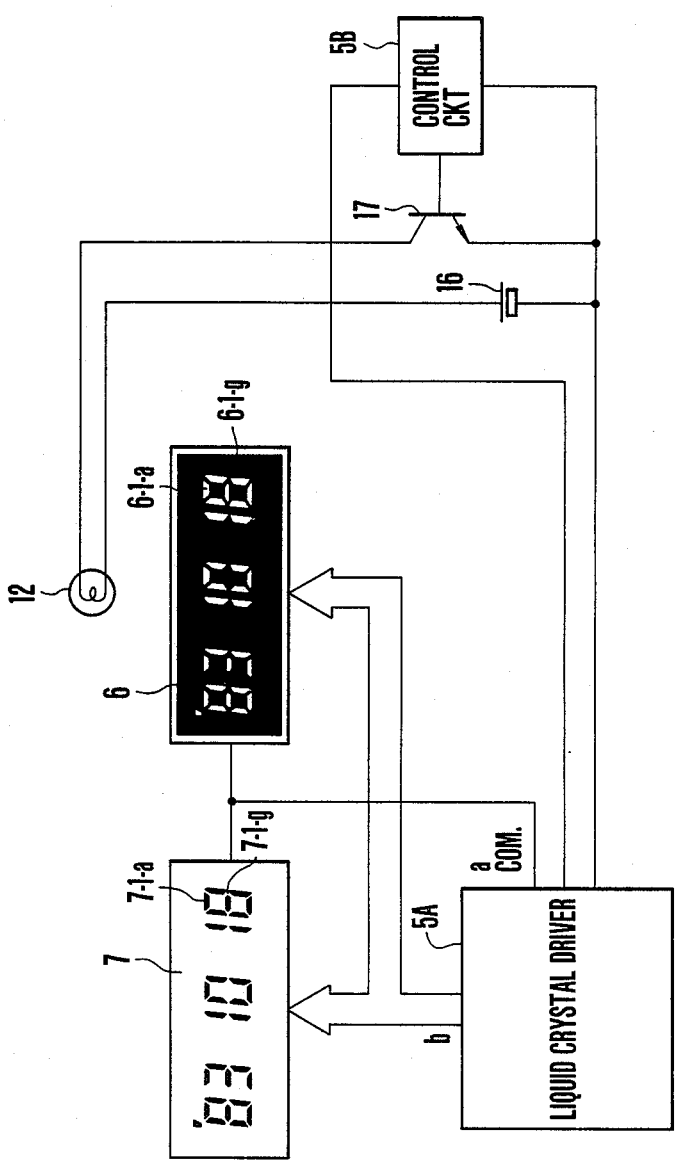
Figures 4, 6A, 6B:
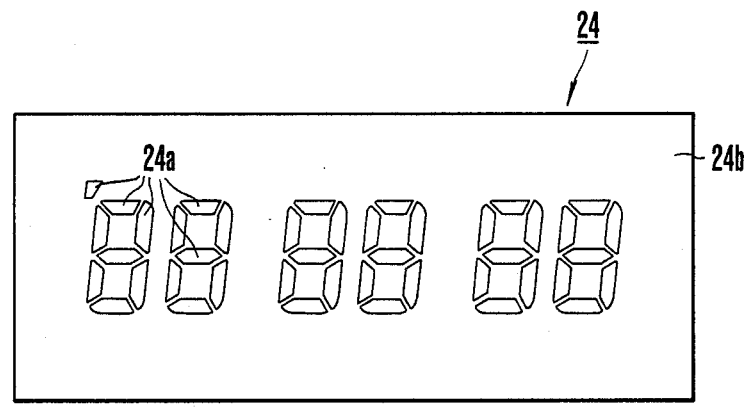
FIGS. 6(a) and 6(b) are plan views showing the LCD's of FIGS. 3 and 5 lit.

The LCD 7' is provided with a reflecting plate (not shown) and displays letters or figures or the like by the reflection of an external light entered through the liquid crystal layer 29 thereof. The LCD 6' is illuminated by the lamp 12 and imprints data such as letters or figures or the like by the transmission of illumination light. Furthermore, the LCD 6' is covered by the metal mask 24, except for segment parts which form the letters or figures or the like as shown in FIG. 4. The power supply 16 is provided for the imprinting lamp 12. The transistor 17 is provided for lighting up the lamp 12. The control circuit 5B is arranged in the same manner as the control circuit 5B shown in FIG. 2 to control the timing for lighting up the lamp 12.

FIGS. 8(a)-8(h) show driving waveforms to be applied to the liquid crystal. FIG. 8(a) shows the waveform of a common signal produced from the common signal terminal "a'" of the liquid crystal driver 5A. FIG. 8(b) shows the waveform of a segment signal for each segment SEG1 to be lit up. FIG. 8(c) shows the waveform of a segment signal for each segment SEG2 not to be lit up. FIG. 8(d) shows the waveform of a common signal supplied to the terminal COM'. The waveform of FIG. 8(d) differs 180 degrees in phase from that of FIG. 8(a). The waveform of a signal applied to the lit up segment SEG1 of the LCD 7' becomes as shown in FIG. 8(e), while the waveform of a signal applied to the non-lit up segment SEG2 of the LCD 7' becomes as shown in FIG. 8(f). The segment SEG1 of the LCD 6' which corresponds to the segment SEG1 of the LCD 7' has waveform signal as shown in FIG. 8(g), while the segment SEG2 of the LCD 6' as shown in FIG. 8(h).

Accordingly, the segment SEG1 of the LCD 7' has a voltage applied thereto while the corresponding segment SEG1 of the LCD 6' has no voltage applied thereto. Conversely, the segment SEG2 of the LCD 7' has no voltage applied thereto, while the segment SEG2 of the LCD 6' has a voltage applied thereto. With these LCD's 6', 7' arranged in this manner, while some letters or figures or the like are displayed by the LCD 7', the same letters or figures or the like are imprinted on the film 3 by the illumination of the LCD 6' with the light from the lamp 12.

Figure 9:
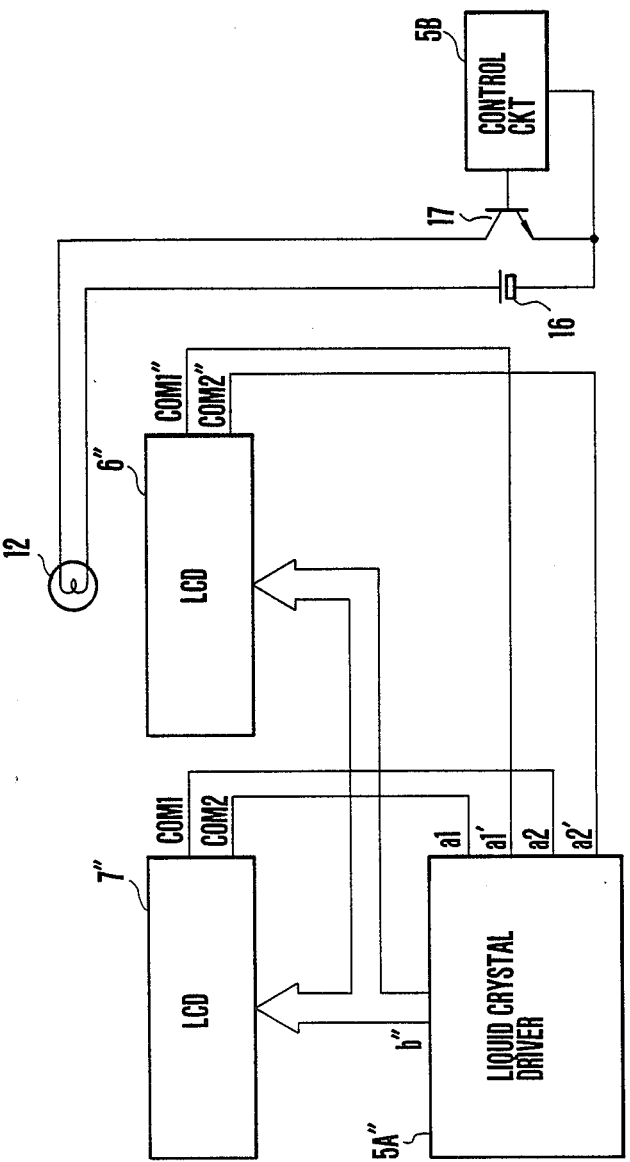
FIG. 9 is a circuit diagram showing the circuit arrangement of another embodiment of this invention.

FIG. 9 shows another embodiment of the invention wherein the LCD driving method is changed to dynamic driving of ½ duty. The same component parts as those shown in FIG. 7 are identified by the same reference numerals and symbols. To the common terminals COM 1 and COM 2 of the LCD 7" are applied waveform signals represented by FIGS. 10(a) and 10(b). Waveform signals which are, represented by FIGS. 10(e) and 10(f), are applied to common terminals COM 1" and COM 2" of LCD 6". Signals of waveforms, which are represented by FIGS. 10(c) and 10(d), are applied to segments 1 and segments 2, respectively.

Segment signals are applied to LCD 7" in such a manner that the segments SEG1 connected to the terminal COM 1 light up and the segments SEG2 connected to the terminal COM 1 do not light up while the segments SEG1 of the terminal COM 2 do not light up the segments SEG2 of the terminal COM 2 also do not light up. The segments of the LCD 6" then light up and do not light up in a manner opposite the corresponding signals of the LCD 7", as shown in FIGS. 10(i) and 10(j). Therefore, when letters or figures or the like are displayed by the LCD 7", the same letters or figures are imprinted on the film 3 with the LCD 6" illuminated by the lamp 12.

Figure 5:
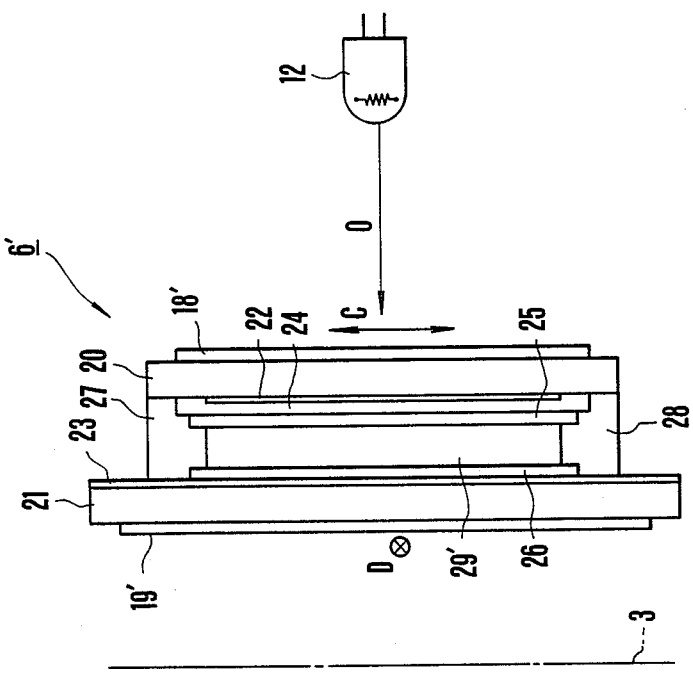
FIG. 5 is a sectional view showing a transmission type LCD arranged according to this invention.
Figure 3:
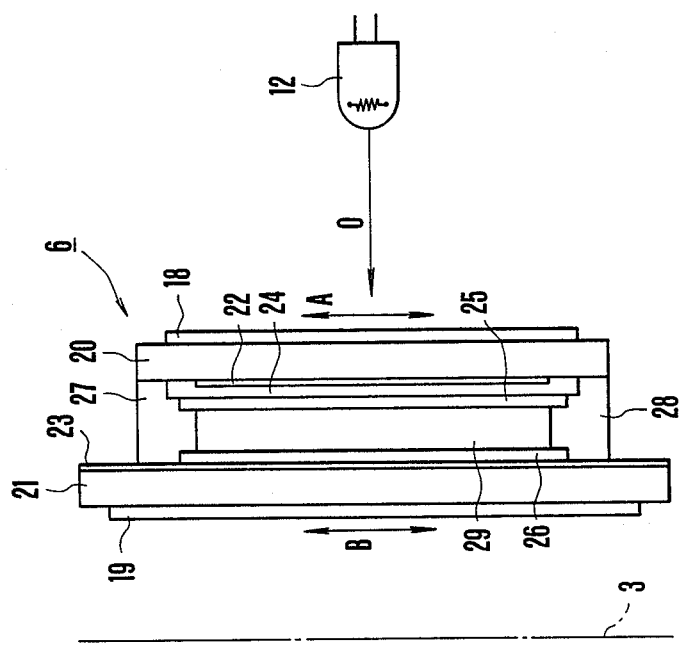

In accordance with this invention as described above, the liquid crystal driving circuit is simply arranged as shown in FIG. 7 in the case of static driving and as shown in FIG. 9 in the case of dynamic driving. The arrangement of the invention thus permits use of the transmission type LCD of the kind arranged as shown in FIG. 5 for the data imprinting means without bringing any inconvenience upon the monitor LCD. Therefore, the invention increases the absolute light shielding degree and the display contrast, so that the quality of the imprinted data can be enhanced. It is another advantage of the invention that it dispenses with addition of a dichromatic dye, so that a data imprinting device of a good responsivity can be obtained at a low cost.

In accordance with this invention, with some of or all of the plurality of segments terminals possessed by a single liquid crystal driver used in common for driving a plurality of liquid crystal display devices, the common terminals connected to each of the liquid crystals are arranged to have their phases varied, so that the same display can be satisfactorily made by these different liquid crystals without any inconvenience. While some data imprinting devices have been described in the foregoing as preferred embodiments, the invention is of course not limited to these embodiments but may be otherwise variously arranged within the principles of the invention.

What is claimed is:
1. A display device for a camera, comprising:
(a) a first liquid crystal display unit having a common electrode and segment electrodes for displaying letters or figures or the like in a non-transmissive state by shapes of the segment electrodes with a potential difference generated between said common electrode and said segment electrodes, said first liquid crystal display unit being used for monitoring;
(b) a second liquid crystal display unit having a common electrode and segment electrodes for displaying letters or figures or the like in a transmissive state by shapes of the segment electrodes without generating a potential difference between said common electrode and said segment electrodes, wherein said segment electrodes of said second liquid crystal display unit have a region with an almost same shape as that of said segment electrodes of the first liquid crystal display unit and said second liquid crystal display unit is used for imprinting data on a film;
(c) a display circuit for driving said first and second liquid crystal display units, said display circuit having a driver being connected to said segment electrodes having said regions with the same shape of both said first and second liquid crystal display units so as to supply same segment signals thereto, and said driver being connected to said common electrodes of both said liquid crystal display units so as to supply common signals having phases inversed between the two common electrodes; and
(d) a light source for imprinting data, positioned near said second liquid crystal unit.
2. A display device according to claim 1, wherein:
said first liquid crystal display unit and said second liquid crystal display unit are disposed side-by-side.
3. A display device according to claim 1, wherein:
said first and second liquid crystal display units are disposed within a back lid.
4. A display device according to claim 1, wherein:
said first and second liquid crystal display units are mounted on a same printed circuit board.
5. A display device for a camera, comprising:
(a) a first liquid crystal display unit having a common electrode and segment electrodes for displaying letters or figures or the like in a non-transmissive state by shapes of the segment electrodes with a potential difference created between said common electrode and said segment electrodes;
(b) a second liquid crystal display unit having a common electrode and segment electrodes for displaying letters or figures or the like in a light transmissive state by shapes of the segment electrodes when a potential difference is not generated between said common electrode and said segment electrodes, wherein said segment electrodes of the second liquid crystal display unit have a region with an almost same shape as that of said segment electrodes of the first liquid crystal display unit, and wherein a mask having an opening over a region of said segment electrodes, is formed at said second liquid crystal display unit; and
(c) a display circuit for driving both of said first and second liquid crystal display units, said display circuit having a driver being connected to segment electrodes of both said first and second liquid crystal display units having regions with the same shape so as to supply same segment signals thereto, and said driver is connected to said common electrodes of both said liquid crystal display units so as to supply common signals having respective phases inversed therebetween.
6. A display device according to claim 5, wherein:
said mask is made of a layer of masks having an opening only over a region of said segment electrodes.
7. A display device according to claim 5, wherein:
said mask is disposed between said segment electrodes and said common electrode.

* * * * *